United States Patent
Tai et al.

(10) Patent No.: US 8,350,974 B2
(45) Date of Patent: Jan. 8, 2013

(54) THREE-DIMENSIONAL DISPLAY APPARATUS

(75) Inventors: Wen-Chih Tai, Taoyuan County (TW); Shian-Jun Chiou, Taipei (TW); Chia-Lin Liu, Taichung County (TW); Chi-Neng Mo, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 743 days.

(21) Appl. No.: 12/496,655

(22) Filed: Jul. 2, 2009

(65) Prior Publication Data
US 2010/0296012 A1    Nov. 25, 2010

(30) Foreign Application Priority Data
May 22, 2009   (TW) ............................... 98209055 U

(51) Int. Cl.
G02F 1/133      (2006.01)
G02F 1/1347     (2006.01)
(52) U.S. Cl. ............... 349/15; 349/68; 349/77; 345/6
(58) Field of Classification Search .............. 349/15, 349/61, 77, 68; 345/4, 5, 6, 9, 102; 348/52
See application file for complete search history.

(56) References Cited

U.S. PATENT DOCUMENTS

| 2006/0268203 | A1* | 11/2006 | Kurahashi et al. | 349/108 |
| 2007/0063925 | A1* | 3/2007 | Yoshihara et al. | 345/4 |
| 2007/0165027 | A1 | 7/2007 | Nakadaira et al. | |
| 2010/0039503 | A1* | 2/2010 | Lin et al. | 348/51 |
| 2010/0149176 | A1* | 6/2010 | Chang et al. | 345/419 |

\* cited by examiner

Primary Examiner — Dung T. Nguyen
Assistant Examiner — Tai Duong
(74) Attorney, Agent, or Firm — Jianq Chyun IP Office

(57) ABSTRACT

A three-dimensional display apparatus, including a backlight module, two panels, and a synchronization device, is provided. The backlight module has a light emitting side and sequentially emits a plurality of color light. Both panels are disposed at the light emitting side, and the first panel is disposed between the backlight module and the second panel. The first panel includes a first polarizer and a first liquid crystal substrate, and the first polarizer is disposed between the backlight module and the first liquid crystal substrate. The second panel includes a second liquid crystal substrate and a second polarizer, and the second liquid crystal substrate is disposed between the second polarizer and the first panel. The synchronization device is electrically connected to the backlight module and the two liquid crystal substrates. During a frame time, the backlight module and the two liquid crystal substrates are synchronously driven by the synchronization device.

9 Claims, 5 Drawing Sheets

THREE-DIMENSIONAL DISPLAY APPARATUS

CROSS-REFERENCE TO RELATED APPLICATION

This application claims the priority benefit of Taiwan application serial no. 98209055, filed on May 22, 2009. The entirety of the above-mentioned patent application is hereby incorporated by reference herein and made a part of specification.

BACKGROUND OF THE INVENTION

1. Field of Invention

The present invention generally relates to a display apparatus; more specifically, to a three-dimensional display apparatus.

2. Description of Related Art

With recent advancements of display technologies, the research focus has gradually shifted towards devices that can generate three-dimensional (3D) images.

FIG. 1A is an exploded view of a conventional 3D display apparatus.

Referring to FIG. 1A, a conventional 3D display apparatus 100 includes a first panel 110, a second panel 120 and a cold cathode fluorescent light source 130 (placed in order). Between the first panel 110 and the second panel 120 there is a depth D. 3D image effects are generated due to the image brightness difference between images formed by the first panel 110 and the second panel 120, coupled with human visual illusion of this scene. Observer P perceives the generated image as if the image is located between the first panel 110 and the second panel 120. This technology is commonly known as Depth-Fused 3D, or DFD.

More specifically, as shown in FIG. 1A, the image brightness values on the first panel 110 and the second panel 120 are determined by their respective cross-sectional densities. The higher the panel cross-sectional density, the higher the brightness value; conversely, the image brightness value will be lower. Due to the lower image brightness value at a first location A1 of the first panel 110 with respect to the image brightness value at a second location A2 of the second panel 120, the observer P perceives a deeper image there. The perceived image will be located closer to the second panel 120 (farther away from the observer P). Similarly, the image brightness value at a third location A3 of the first panel 110 is higher than the image brightness value at a fourth location A4 of the second panel 120. Therefore, observer P observes a shallower image there, and the perceived image will be located closer to the first panel 110 (closer to the observer P). FIG. 1B is a schematic perspective view of the first and second panels of the 3D display found in FIG. 1A. Referring to FIG. 1B, the first panel 110 and the second panel 120 each respectively includes a polarizer 111,121, an active device array substrate 113,123, a color filter 115,125, and a substrate 117,127. It should be noted that a light ray L emanating from the cold cathode fluorescent light source 130 travels sequentially through the polarizer 121 of the second panel 120, the active device array substrate 123, the color filter 125, the substrate 127, the active device array substrate 113 of the first panel 110, the color filter 115, the substrate 117, the polarizer 111, and then the light ray L enters the eyes of the observer P.

The technology aforementioned makes use of two panels (the first panel 110 and the second panel 120), where the panel transmittances of the first panel 110 and the second panel 120 are very low, at around 5%. Therefore, brightness value of the light ray L emanating from the cold cathode fluorescent light source 130 will be significantly reduced after the light ray L passes through the first panel 110 and the second panel 120. In other words, there is a significant difference between the image brightness value the observer P perceives and the original brightness value of the cold cathode fluorescent light source 130. Hence, when the need to present more brilliant images arises, the cold cathode fluorescent light source 130 must be turned quite bright, hereby significantly increasing the power consumption of the 3D display apparatus 100.

SUMMARY OF THE INVENTION

Accordingly, the present invention provides a 3D display apparatus capable of generating quality 3D color images while featuring better panel transmission rate and lower power consumption.

The present invention provides a 3D display apparatus including a backlight module, a first panel, a second panel, and a synchronization device. The backlight module has a light emitting side, and the backlight module sequentially emits a plurality of color light. The first panel is disposed at the light emitting side, and the first panel includes a first polarizer and a first liquid crystal substrate. The first polarizer is disposed between the first liquid crystal substrate and the backlight module. The second panel is disposed at the light emitting side, and the first panel is disposed between the backlight module and the second panel. The second panel includes a second liquid crystal substrate and a second polarizer, and the second liquid crystal substrate is disposed between the second polarizer and the first panel. The synchronization device is electrically connected to the backlight module, the first liquid crystal substrate, and the second liquid crystal substrate. During a frame time, the synchronization device synchronously drives the backlight module and the first and second liquid crystal substrates.

In one embodiment of the present invention, during the frame time, the synchronization device aforementioned coordinates the color light sequentially emitted by the backlight module with the image information generated by the first and second liquid crystal substrates.

In one embodiment of the present invention, during the aforementioned frame time, the synchronization device receives a first driving signal from the backlight module and generates a second driving signal and a third driving signal, sends the second signal to the first liquid crystal substrate, and sends the third driving signal to the second liquid crystal substrate.

In one embodiment of the present invention, during the aforementioned frame time, the synchronization device receives a first driving signal from the first liquid crystal substrate and generates a second driving signal and a third driving signal, sends the second driving signal to the backlight module, and sends the third driving signal to the second liquid crystal substrate.

In one embodiment of the present invention, during the aforementioned frame time, the synchronization device receives a first driving signal from the second liquid crystal substrate and generates a second driving signal and a third driving signal, sends the second driving signal to the backlight module, and sends the third driving signal to the first liquid crystal substrate. In another embodiment of the invention, during the aforementioned frame time, the synchronization device generates a first, second, and third driving signal and synchronously sends the three signals to the backlight module, the first liquid crystal substrate, and the second liquid crystal substrate, respectively.

In one embodiment of the present invention, during the aforementioned frame time, the images generated by the first and second liquid crystal substrates are combined to generate a 3D image.

In one embodiment of the present invention, the aforementioned first image and second image have unequal image brightness values.

In one embodiment of the present invention, the three-dimensional display apparatus further includes a third liquid crystal substrate disposed between the first and second panels.

In one embodiment of the present invention, during the frame time, the aforementioned synchronization device coordinates the color light sequentially emitted by the backlight module with the image information displayed by the first, second, and third liquid crystal substrates.

In one embodiment of the present invention, during the aforementioned frame time, the synchronization device receives a first driving signal from the first liquid crystal substrate and generates a second, third, and fourth driving signal, sends the second driving signal to the backlight module, sends the third driving signal to the third liquid crystal substrate, and sends the fourth driving signal to the second liquid crystal substrate.

In one embodiment of the present invention, during the aforementioned frame time, the images generated by the first, second, and third liquid crystal substrates are combined to generate a 3D image.

In one embodiment of the present invention, the image brightness values of the aforementioned first, second, and third images are all unequal.

In one embodiment of the present invention, the aforementioned backlight module includes matrix backlight units; each of backlight units includes one red light-emitting diode (LED), one green LED, and one blue LED.

In one embodiment of the present invention, the aforementioned first liquid crystal substrate includes the first active device array substrate, a first opposite substrate, and a first liquid crystal layer. The first active device array substrate includes a plurality of matrix first-pixel units, where each of the first-pixel units corresponds to a plurality of backlight units. The first opposite substrate is disposed opposite to the first active device array substrate. The first liquid crystal layer is disposed between the first active device array substrate and the first opposite substrate.

In one embodiment of the present invention, the aforementioned second liquid crystal substrate includes a second active device array substrate, a second opposite substrate, and a second liquid crystal layer. The second active device array substrate includes a plurality of matrix second-pixel units, where each of the second-pixel unit has a plurality of corresponding backlight units. The second opposite substrate is disposed opposite to the second active device array substrate. The second liquid crystal layer is disposed between the second active device array substrate and the second opposite substrate.

In one embodiment of the present invention, the polarizing direction of the aforementioned first polarizer is substantially perpendicular to the polarizing direction of the aforementioned second polarizer.

Based on the above, the 3D display apparatus of the present invention is spared of the poorly transmissive color filters. The 3D display apparatus also replaces the conventional cold cathode fluorescent light source with a backlight module that sequentially emits a plurality of color light. Therefore, the 3D display apparatus of the present invention possesses a higher transmission rate. Furthermore, the 3D display apparatus also includes a synchronization device which, during a frame time, synchronizes the driving of the backlight module and the first and second panels such that the emitted color light from the backlight module can be coordinated with the image information generated by the first and second panels. Consequently, quality color 3D images are generated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
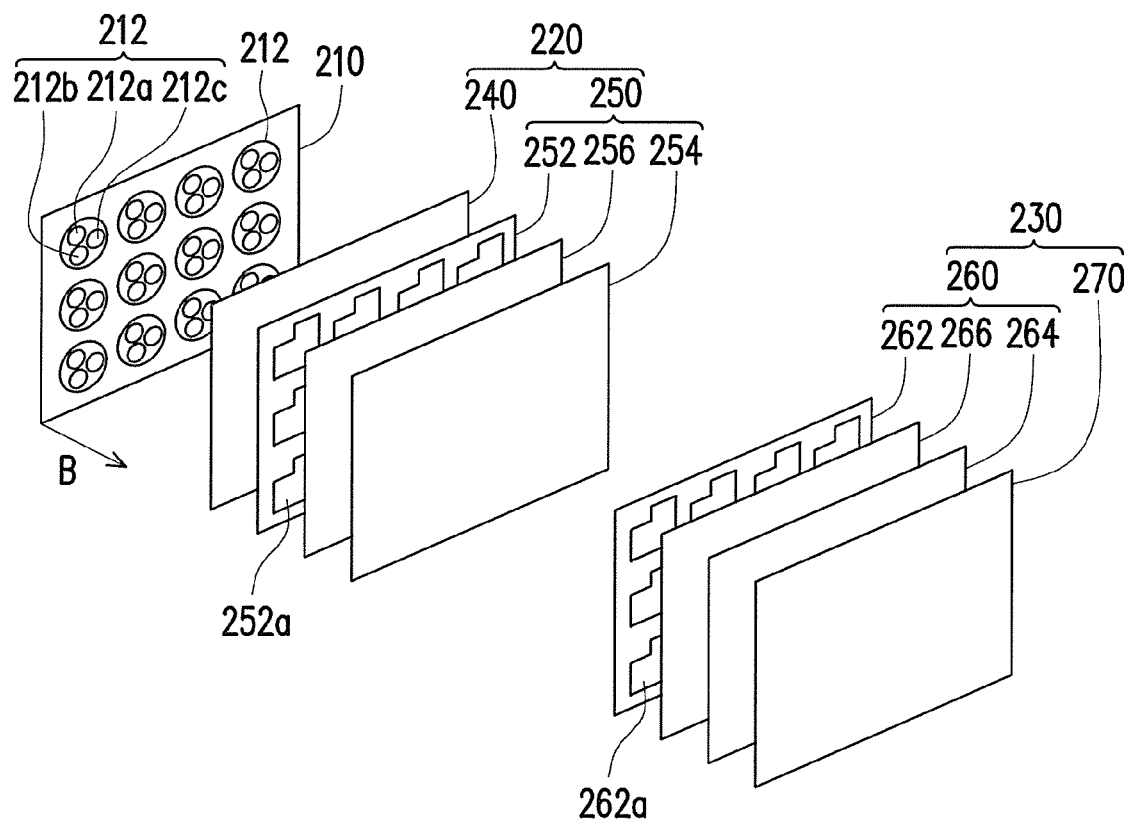
FIG. 2 is an exploded view of an embodiment of the 3D display apparatus of the present invention.
Figure 3:
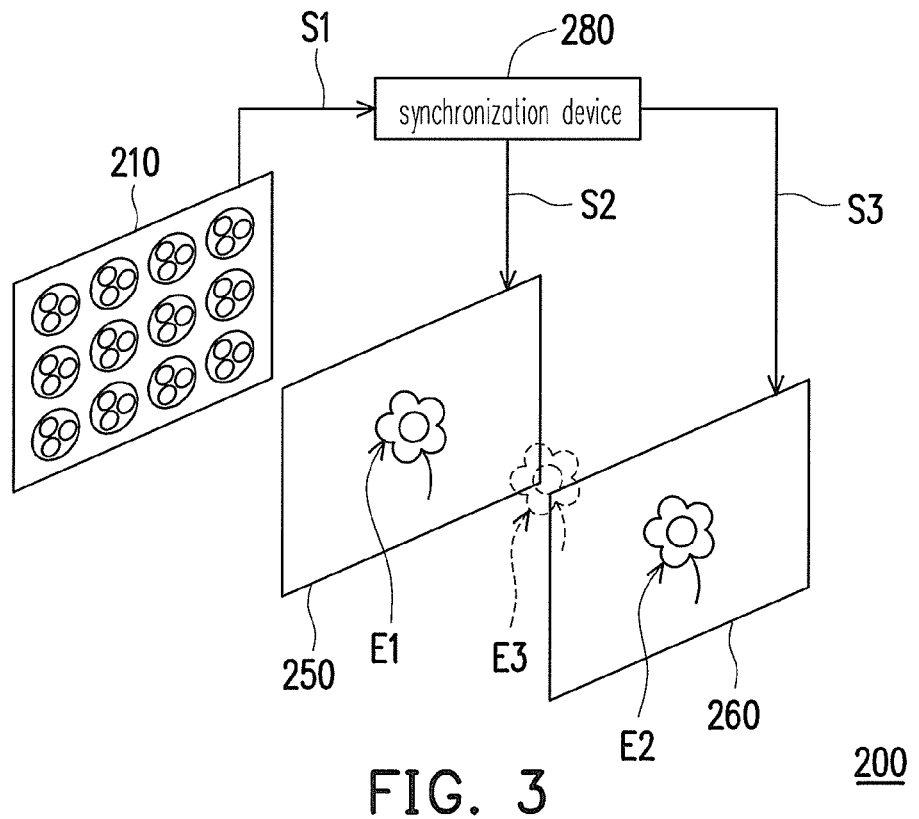
FIG. 3 to FIG. 6 are schematic views that show the driving schemes between components of the 3D display apparatus in FIG. 2.

FIG. 2 is an exploded view of an embodiment of the 3D display apparatus of the present invention. FIG. 3 to FIG. 6 are schematic views that show the driving schemes between components of the 3D display apparatus in FIG. 2. In FIG. 3 to FIG. 6, only the backlight module 210, the first liquid crystal substrate 250, the second liquid crystal substrate 260, and the synchronization device 280 of the 3D display apparatus 200 are drawn in order to show the driving schemes between each component. Following, FIG. 2 and FIG. 3 are referenced to explain how the 3D display apparatus 200 is built. Referring to FIG. 2 and FIG. 3, this 3D display apparatus 200 includes the backlight module 210, the first panel 220, the second panel 230, and the synchronization device 280. The backlight module 210 has a light emitting side B, and the backlight module 210 sequentially emits a plurality of color light (not drawn). The first panel 220 is disposed in the light emitting side B, and the first panel 220 includes a first polarizer 240 and a first liquid crystal substrate 250; the first polarizer 240 is disposed between the first liquid crystal substrate 250 and the backlight module 210. The second panel 230 is disposed in the light emitting side B; the first panel 220 is disposed between the backlight module 210 and the second panel 230. The second panel 230 includes a second liquid crystal substrate 260 and a second polarizer 270; the second liquid substrate 260 is disposed between the second polarizer 270 and the first panel 220. The synchronization device 280 is electrically connected to the backlight module 210, the first liquid crystal substrate 250, and the second liquid crystal substrate 260. During a frame time, the backlight module 210, the first liquid crystal layer 250, and the second liquid crystal layer 260 are synchronously driven by the synchronization device 280.

Continuing reference to FIG. 2, the backlight module 210 may include matrix backlight units 212; each of the backlight units 212 includes one red LED 212a, one green LED 212b, and one blue LED 212c. Hence, the backlight module 210 can sequentially emit red, green, and blue light (not drawn). In particular, in the short span of human visual retention, the rapid switching of red, green, and blue light emitted from the red LED 212a, the green LED 212b, and the blue LED 212c, respectively, results in a color mixing effect. This technique is called the Color Sequential Method. Therefore, the 3D display apparatus 200 of the present invention can omit the use of color filters. However, the present invention does not limit the model of the backlight module 210; any backlight module capable of sequentially emitting a plurality of color light is within the scope of the present invention.

Referring to FIG. 2, the first liquid crystal substrate 250 includes a first active device array substrate 252, a first opposite substrate 254, and a first liquid crystal layer 256. The first active device array substrate 252 includes matrix first-pixel units 252a; each of the first-pixel unit 252a corresponds to backlight units 212. The first opposite substrate 254 is disposed opposite to the first active device array substrate 252. The liquid crystal layer 256 is disposed between the active device array substrate 252 and the opposite substrate 254.

Similarly, the second liquid crystal substrate 260 includes a second active device array substrate 262, a second opposite substrate 264, and a second liquid crystal layer 266. The second active device array substrate 262 includes matrix second-pixel units 262a; each of the second-pixel units 262a corresponds to backlight units 212. The second opposite substrate 264 is disposed opposite to the second active device array substrate 262. The second liquid crystal layer 266 is disposed between the active device array substrate 262 and the second opposite substrate 264.

In addition, the 3D display apparatus 200 of the present invention needs only one set of polarizers, namely the first polarizer 240 and the second polarizer 270 in order to generate quality images. The first polarizer 240 is disposed between the backlight module 210 and the first panel 220; the second polarizer 270 is disposed at a side of the second panel 230 away from the first panel 220. In particular, the polarizing direction of the first polarizer 240 is substantially perpendicular to the polarizing direction of the second polarizer 270.

As shown above, one of the features of the 3D display apparatus 200 of the present invention includes the omission of color filters, thereby improving panel transmission rate of the first panel 220 and the second panel 230 by around 15%. Color images are generated by direct application of the plurality of color light (not drawn) provided by the backlight module 210 of the present invention, in combination with the Color Sequential Method for mixing the emitted color light. By also applying the DFD technique on the first panel 220 and the second panel 230, high resolution color 3D images are generated.

Figure 1A:
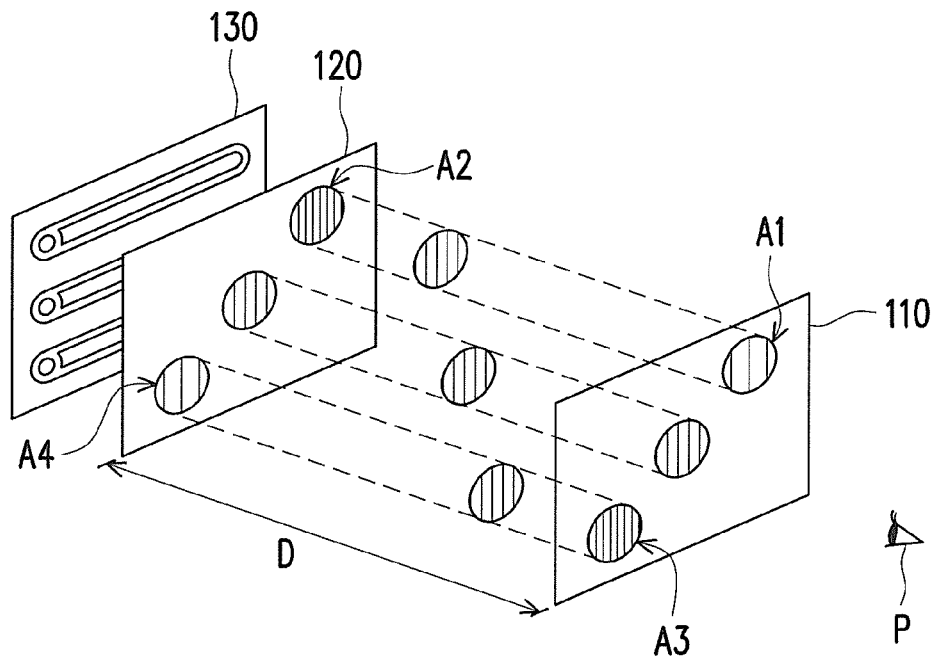
FIG. 1A is an exploded view of the conventional 3D display apparatus.
Figure 1B:
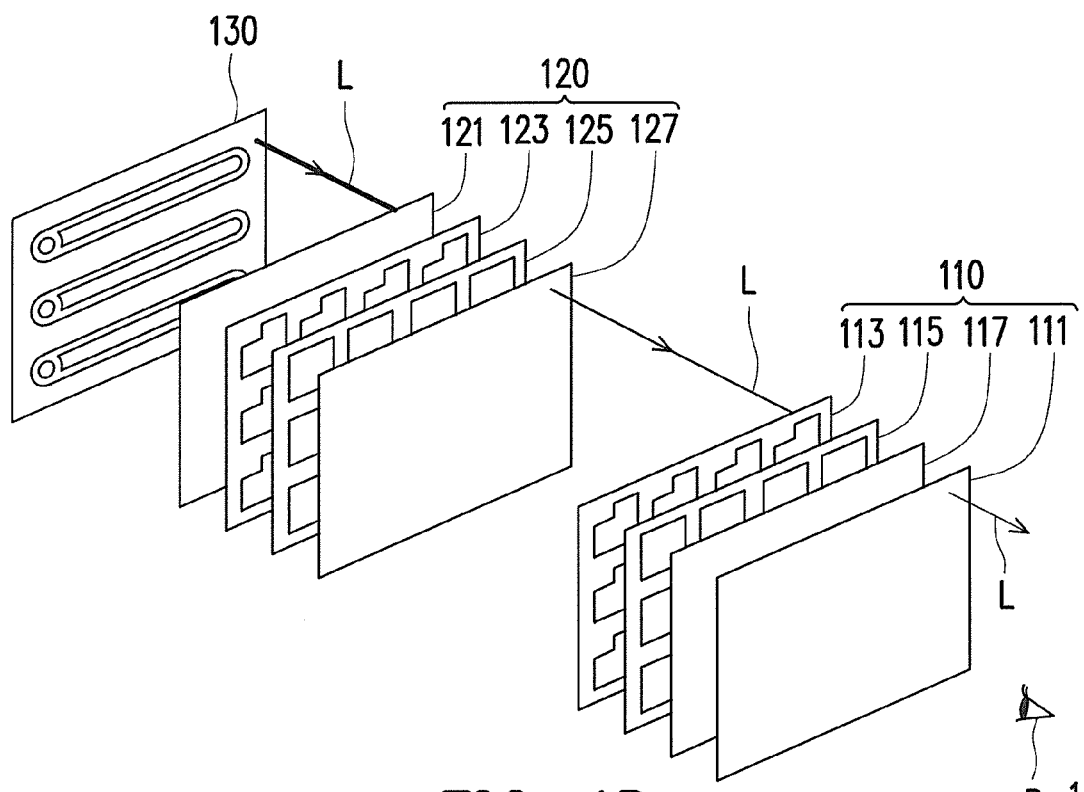
FIG. 1B is a schematic perspective view of the first and second panel of the 3D display apparatus in FIG. 1A.

In more detail, if for basis of calculation the acceptable image brightness value for observer P is 200 nits, and the panel transmission rate of the first panel 110 and the second panel 120 of the conventional 3D display apparatus 100 in FIG. 1A and FIG. 1B is 5%, then the required brightness value from the cold cathode fluorescent light source 130 is:

$$200(nits)/(5\%*5\%)=80,000(nits)$$

However, the panel transmission rate of the first panel 220 and the second panel 230 of the 3D display apparatus 200 is improved to 15%, so in actuality, the required brightness from the backlight module 210 is only:

$$200(nits)/(15\%*15\%)=8,888(nits)$$

In light of the above-mentioned, the actual brightness required (8,888 nits) from the backlight module 210 of the present invention is about one tenth of the brightness required (80,000 nits) from the conventional cold cathode fluorescent light source 130. Therefore, there are drastic savings with brightness loss and power consumption to be gained from the backlight module 210.

As shown in FIG. 3, during the frame of time, a first image E1, generated by the first liquid crystal substrate 250, and a second image E2, generated by the second liquid crystal substrate 260, are combined to form one 3D image E3. In particular, because the brightness of the first image E1 is not equal to the brightness of the second image E2, the 3D image E3 is generated by the DFD technique.

It should be noted that another feature of the 3D display apparatus 200 of the present invention is that, during the frame time, the synchronization device 280 coordinates color light sequentially emitted from the backlight module 210 with the image information generated by the first liquid crystal substrate 250 and the second liquid crystal substrate 260. In other words, with the control of the synchronization device 280, this 3D display apparatus 200 can generate quality color 3D images and consequently, avoid problems of untrue colors and unsuccessful generations of 3D images.

As shown in FIG. 3, during the frame time, the synchronization device 280 receives a first driving signal S1 from the backlight module 210 and generates a second driving signal S2 and a third driving signal S3, sends the second driving signal S2 to the first liquid crystal substrate 250, and sends the third driving signal S3 to the second liquid crystal substrate 260. At this time, the backlight module 210 is the actively driven device; the first liquid crystal substrate 250 and the second liquid crystal substrate 260 are passively driven devices.

However, the active/passive driving schemes between the backlight module 210, the first liquid crystal substrate 250, and the second liquid crystal substrate 260 are not limited to what is shown in FIG. 3. For example, alternate driving schemes may be found in FIG. 4 to FIG. 6.

Figure 4:
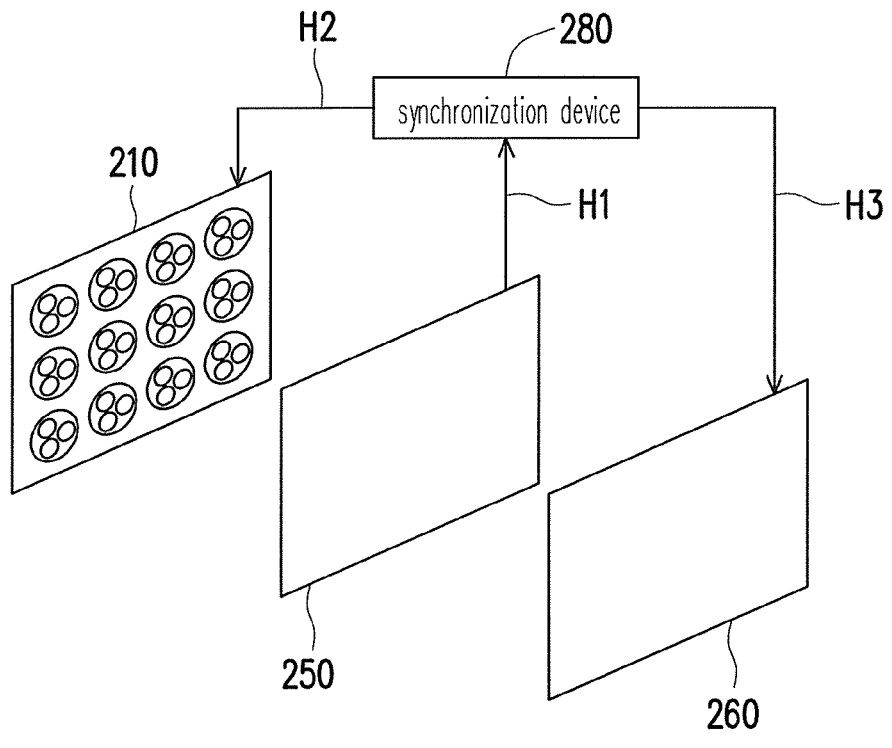

Referring to FIG. 4, during the frame time, the synchronization device 280 receives a first driving signal H1 from the first liquid crystal substrate 250 and generates a second driving signal H2 and a third driving signal H3, sends the second driving signal H2 to the backlight module 210, and sends the third driving signal H3 to the second liquid crystal substrate 260. At this time, the first liquid crystal substrate 250 is the actively driven device; the backlight module 210 and the second liquid crystal substrate 260 are passively driven devices.

Figure 5:
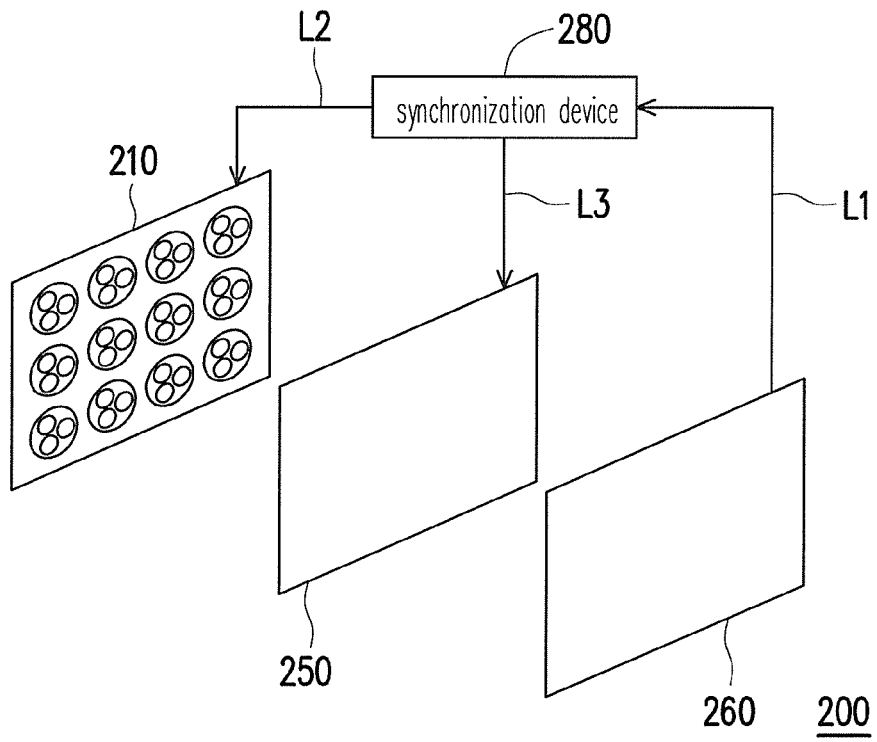

Referring to FIG. 5, during the frame time, the synchronization device 280 receives a first driving signal L1 from the second liquid crystal substrate 260 and generates the second driving signal L2 and the third driving signal L3, sends the second driving signal L2 to the backlight module 210, and sends the third driving signal L3 to the first liquid crystal substrate 250. At this time, the second liquid crystal substrate 260 is the actively driven device; the backlight module 210 and the first liquid crystal substrate 250 are passively driven devices.

Figure 6:
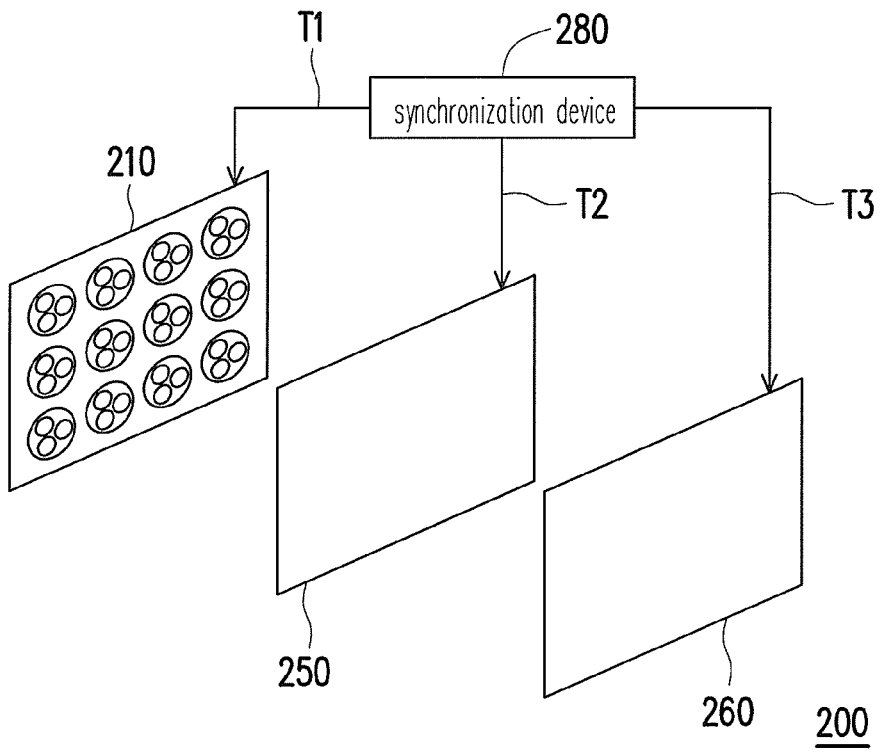

During the frame time, FIG. 6 shows that the synchronization device 280 can synchronously generate a first driving signal T1, a second driving signal T2, and a third driving signal T3 and send the signals to the backlight module 210, the first liquid crystal substrate 250, and the second liquid crystal board 260, respectively. At this time, the synchronization device 280 is the actively driven device; the backlight module 210, the first liquid crystal substrate 250 and the second liquid crystal substrate 260 are the passively driven devices. Based on the above, any driving schemes capable of coordinating the driving of the backlight module 210, the first liquid crystal substrate 250, and the second liquid crystal substrate 260 is within the realm of this invention.

Figure 7:
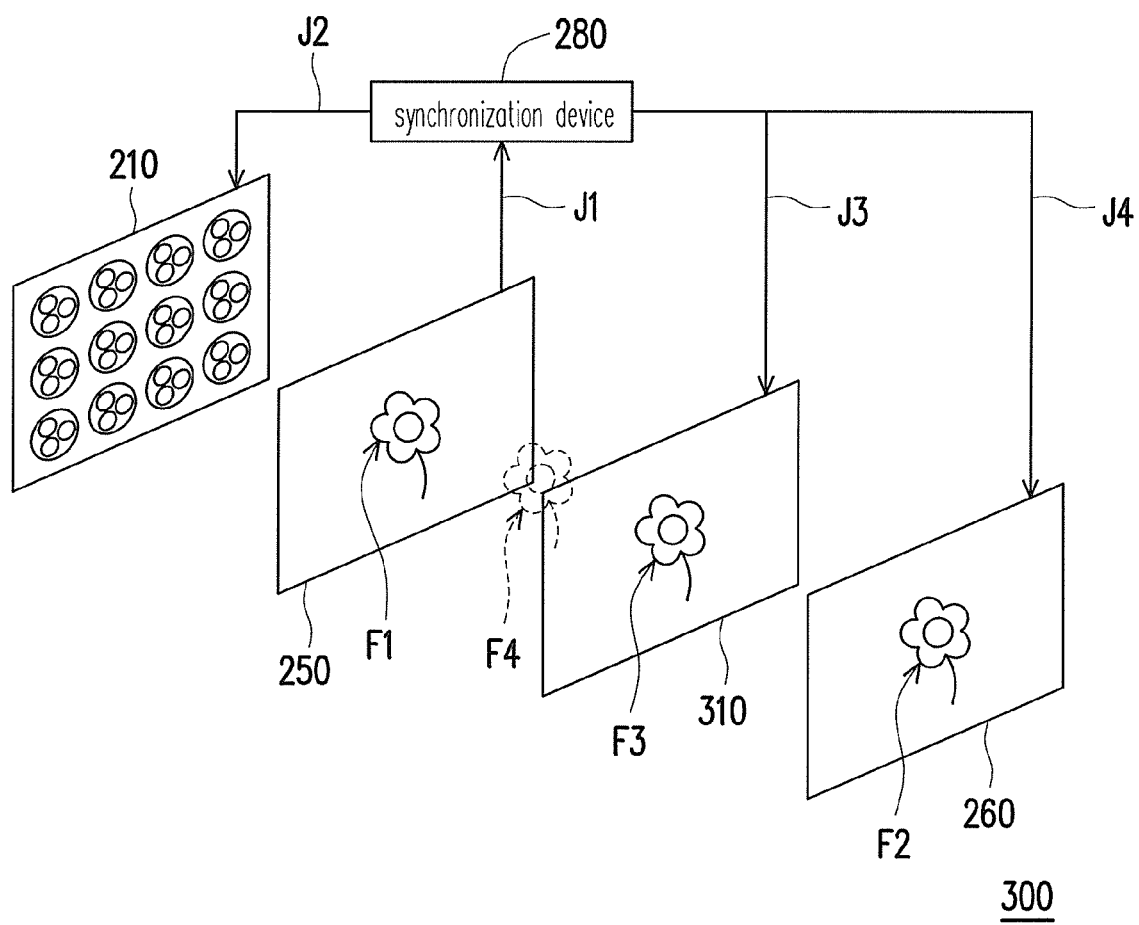
FIG. 7 is an exploded view of another embodiment of the 3D display apparatus of the present invention.

FIG. 7 is an exploded view of another embodiment of the 3D display apparatus of the present invention. Referring to FIG. 7, the same components are given the same numbering. Different from the aforementioned 3D display apparatus 200 in FIG. 2 and FIG. 3, this 3D display apparatus 300 includes an additional third liquid crystal substrate 310 disposed between the first liquid crystal substrate 250 and the second liquid crystal substrate 260. In other words, more than two liquid crystal substrates can be used to generate color 3D images.

As shown in the embodiment of FIG. 7, during the frame time, the synchronization device 280 coordinates color light sequentially emitted from the backlight module 210 with the image information displayed by the first liquid crystal substrate 250, the second liquid crystal substrate 260, and the third liquid crystal substrate 310.

More specifically, during the frame time, the first image F1 generated by the first liquid crystal substrate 250, the second image F2 generated by the second liquid crystal substrate 260, and the third image F3 generated by the third liquid crystal substrate 310 can be combined to generate a 3D image F4. In particular, due to the brightness difference between the first image F1, the second image F2, and the third image F3, the DFD technique can be applied to generate a 3D image F4. Here, the present invention does not set any limitations on the number of liquid crystal substrates, and therefore the designer has the option to change the number of substrates based on the desired depth of the 3D images.

To illustrate further, an example of the driving scheme between each component of this 3D display apparatus 300 is as follows. During the frame time, the synchronization device 280 receives a first driving signal J1 from the first liquid crystal substrate 250 and generates a second driving signal J2, a third driving signal J3, and a fourth driving signal J4, sends the second driving signal J2 to the backlight module 210, sends the third driving signal J3 to the third liquid crystal substrate 310, and sends the fourth driving signal J4 to the second liquid crystal substrate 260. Here, the present invention does not set any limitations on the active/passive driving schemes between the backlight module 210 and the liquid crystal substrates 250, 260, and 310.

In summary, the 3D display apparatus in the present invention has at least the following advantages:

This 3D display apparatus avoids the use of color filters, placed by a backlight module that sequentially emits a plurality of color light for the display of color images, and such arrangement results in the increase of the panel transmission rate. Consequently, brightness degradation is minimized and power consumption of the backlight module is decreased. In addition, problems such as untrue colors and unsuccessful generations of 3D images are avoided with the application of the synchronization device. During the frame time, the synchronization device synchronously drives the backlight module along with a plurality of liquid crystal substrates, coordinating color light sequentially emitted from the backlight module with the image information generated by the liquid crystal substrates.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A three-dimensional display apparatus, comprising:
   a backlight module, wherein said backlight module has a light emitting side, and said backlight module sequentially emits a plurality of color light;
   a first panel, wherein said first panel is disposed at the light emitting side, said first panel comprising a first polarizer and a first liquid crystal substrate, and said first polarizer is disposed between said first liquid crystal substrate and said backlight module;
   a second panel, wherein said second panel is disposed at the light emitting side, said first panel is disposed between said backlight module and said second panel, said second panel comprising a second liquid crystal substrate and a second polarizer, and wherein said second liquid crystal substrate is disposed between said second polarizer and said first panel; and
   a synchronization device electrically connected to said backlight module, said first liquid crystal substrate, and said second liquid crystal substrate, wherein during a frame time, said backlight module, said first liquid crystal substrate, and said second liquid crystal substrate are synchronously driven by said synchronization device; and
   a third liquid crystal substrate disposed between said first panel and said second panel, wherein during said frame time, said synchronization device receives a first driving signal from said first liquid crystal substrate and generates a second driving signal, a third driving signal, and a fourth driving signal, sends said second driving signal to said first backlight module, sends said third driving signal to said third liquid crystal substrate, and sends said fourth driving signal to said second liquid crystal substrate.

2. The three-dimensional display apparatus as claimed in claim 1, wherein said synchronization device coordinates, during the frame time, said color light sequentially emitted from the backlight module with image information displayed by said first liquid crystal substrate and said second liquid crystal substrate.

3. The three-dimensional display apparatus as claimed in claim 1, wherein during said frame time, said synchronization device coordinates said color light sequentially emitted from said backlight module with image information displayed by said first liquid crystal substrate, said second liquid crystal substrate, and said third liquid crystal substrate.

4. The three-dimensional display apparatus as claimed in claim 1, wherein during said frame time, a first image is generated by said first liquid crystal substrate, a second image is generated by said second liquid crystal substrate, and a third image is generated by said third liquid crystal substrate, and the three images are combined to form a three-dimensional image.

5. The three-dimensional display apparatus as claimed in claim 4, wherein the brightness value of said first image, the brightness value of said second image, and the brightness value of said third image are unequal.

6. The three-dimensional display apparatus as claimed in claim 1, wherein said backlight module comprises matrix backlight units, and each of the backlight units further comprises a red light-emitting diode, a green light-emitting diode, and a blue light-emitting diode.

7. The liquid crystal display apparatus as claimed in claim 6, wherein said first liquid crystal substrate comprises:
   a first active device array substrate, comprising a plurality of matrix first-pixel units, wherein each said first-pixel unit corresponds to backlight units;

a first opposite substrate, wherein said first opposite substrate is disposed opposite to said first active device array substrate; and a first liquid crystal layer, wherein said first liquid crystal layer is disposed between said first active device array substrate and said first opposite substrate.

8. The three-dimensional display apparatus as claimed in claim 6, wherein said second liquid crystal substrate comprises:

a second active device array substrate, comprising a plurality of matrix second-pixel units, wherein each said second-pixel unit corresponds to backlight units;

a second opposite substrate, wherein said second opposite substrate is disposed opposite to said second active device array substrate; and a second liquid crystal layer, wherein said second liquid crystal layer is disposed between said second active device array substrate and said second opposite substrate.

9. The three-dimensional display apparatus as claimed in claim 1, wherein the polarizing direction of said first polarizer is substantially perpendicular to the polarizing direction of said second polarizer.

* * * * *